United States Patent
Yamazaki

(10) Patent No.: US 6,593,990 B1
(45) Date of Patent: Jul. 15, 2003

(54) DISPLAY DEVICE

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/295,397

(22) Filed: Apr. 21, 1999

Related U.S. Application Data

(62) Division of application No. 09/045,697, filed on Mar. 23, 1998.

(30) Foreign Application Priority Data

Mar. 26, 1997 (JP) ............................................... 9-092935

(51) Int. Cl.[7] ........................ G02F 1/136; G02F 1/1333
(52) U.S. Cl. ........................................ 349/138; 349/42
(58) Field of Search ............................ 349/42, 43, 138; 257/59, 72

(56) References Cited

U.S. PATENT DOCUMENTS

| | | | |
|---|---|---|---|
| 4,254,426 A | 3/1981 | Pankove | 257/646 |
| 4,650,922 A | 3/1987 | McPherson | 174/52.4 |
| 4,722,913 A | 2/1988 | Miller | 438/659 |
| 4,804,490 A | 2/1989 | Pryor et al. | 438/796 |
| 4,845,533 A | 7/1989 | Pryor et al. | 257/4 |
| 4,869,755 A | 9/1989 | Huschka | 136/259 |
| 4,972,250 A | 11/1990 | Omori et al. | 257/631 |
| 5,117,299 A | 5/1992 | Kondo et al. | 349/52 |
| 5,196,954 A * | 3/1993 | Yamazaki et al. | 349/42 |
| 5,250,451 A | 10/1993 | Chouan | 438/161 |
| 5,330,616 A | 7/1994 | Yamazaki | 216/37 |
| 5,550,066 A | 8/1996 | Tang et al. | |
| 5,583,369 A | 12/1996 | Yamazaki et al. | 257/635 |
| 5,621,556 A * | 4/1997 | Fulks et al. | 349/42 |
| 5,686,328 A | 11/1997 | Zhang et al. | 437/41 |
| 5,696,386 A | 12/1997 | Yamazaki | 257/57 |
| 5,712,495 A | 1/1998 | Suzawa | 257/296 |
| 5,717,224 A | 2/1998 | Zhang | 349/43 |
| 5,739,549 A | 4/1998 | Takemura et al. | 257/59 |
| 5,747,830 A * | 5/1998 | Okita | 257/72 |
| 5,808,315 A * | 9/1998 | Murakami et al. | 257/59 |
| 5,847,410 A * | 12/1998 | Nakajima | 257/59 |
| 5,851,862 A | 12/1998 | Ohtani et al. | 438/487 |
| 5,856,689 A | 1/1999 | Suzawa | 257/296 |
| 5,952,708 A * | 9/1999 | Yamazaki | 257/59 |
| 5,963,278 A * | 10/1999 | Yamazaki et al. | 349/43 |
| 5,995,189 A * | 11/1999 | Zhang | 349/153 |
| 6,005,648 A * | 12/1999 | Zang et al. | 349/43 |
| 6,097,459 A * | 8/2000 | Shimada et al. | 349/113 |
| 6,252,297 B1 | 6/2001 | Kemmochi et al. | |

FOREIGN PATENT DOCUMENTS

| | | |
|---|---|---|
| EP | 0221531 | 5/1987 |
| JP | 55-107270 | 8/1980 |
| JP | 58-145134 | 8/1983 |
| JP | 60-145375 | 7/1985 |
| JP | 61-204933 | 9/1986 |
| JP | 61-244068 | 10/1986 |
| JP | 63-015461 | 1/1988 |
| JP | 05-002187 | 1/1993 |
| JP | 10-10578 A * | 1/1998 |

* cited by examiner

*Primary Examiner*—Toan Ton
*Assistant Examiner*—Dung Nguyen
(74) *Attorney, Agent, or Firm*—Eric J. Robinson; Robinson Intellectual Property Law Office, P.C.

(57) ABSTRACT

There is disclosed a structure for radiating heat generated by TFTs in a liquid crystal panel. A DLC film 125 is provided on a resin interlayer film 123 disposed on the TFTs 105, 109, and 113. The DLC film 125 can be easily formed on the resin film, and has high heat conductivity, so that the film can be made to function as a heat radiating layer.

82 Claims, 3 Drawing Sheets

DISPLAY DEVICE

This application is a Divisional application of Ser. No. 09/045,697, filed Mar. 23, 1998.

BACKGROUND OF THE INVENTION

1. Field of the Invention

The present invention relates to the structure of a reflection type liquid crystal display device.

2. Description of the Related Art

A reflection type liquid crystal panel has been known. Also, in an active matrix type liquid crystal panel, there is known a structure in which a peripheral driving circuit is integrated on the same substrate as an active matrix circuit. This structure is known as a peripheral driving circuit integration type.

In a peripheral driving circuit integration type liquid crystal panel, as a result that high picture quality is pursued, a peripheral driving circuit is required to operate at such a high speed as several tens MHz or more.

However, high speed operation causes a problem of heat generation from a device. Especially, since a liquid crystal panel uses a glass substrate or a quartz substrate, the panel has a problem that there is no escape for heat generated by a device (the thermal conductivity of quartz is 1/100 or less than that of single crystal silicon).

Also, a reflection type liquid crystal display panel is easy to secure a required aperture factor even if it is miniaturized. Accordingly, it has been considered to use the display panel for a projection type display.

However, since a liquid crystal panel for a projector is miniaturized (about 3 inches or less in diagonal), the above described problem of heat generation (heat generation from a peripheral driving circuit) especially becomes important.

Specifically, the peripheral driving circuit has such problems that the device characteristic is changed or deteriorated, or the device itself is broken by the heat generated by the circuit itself.

SUMMARY OF THE INVENTION

An object of the present invention is therefore to provide a structure of a display device capable of solving this sort of problem.

According to one aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion; an interlayer insulating film made of resin material and disposed over the thin film transistor; and a carbon film disposed on the interlayer insulating film.

According to another aspect of the present invention, a display device is comprised of a pixel matrix portion; a peripheral driving circuit portion disposed on the same substrate as the pixel matrix portion; a thin film transistor disposed in each of the pixel matrix portion and the peripheral driving circuit portion, an interlayer insulating film made of resin material and disposed over the thin film transistor; and a carbon film as a heat releasing layer disposed on the interlayer insulating film.

It is preferable to use a DLC (Diamond-like Carbon) film as the carbon film. The DLC film is a carbon film comprising amorphous carbon having $SP^3$ bonds.

DETAILED DESCRIPTION OF THE INVENTION

Figure 1:
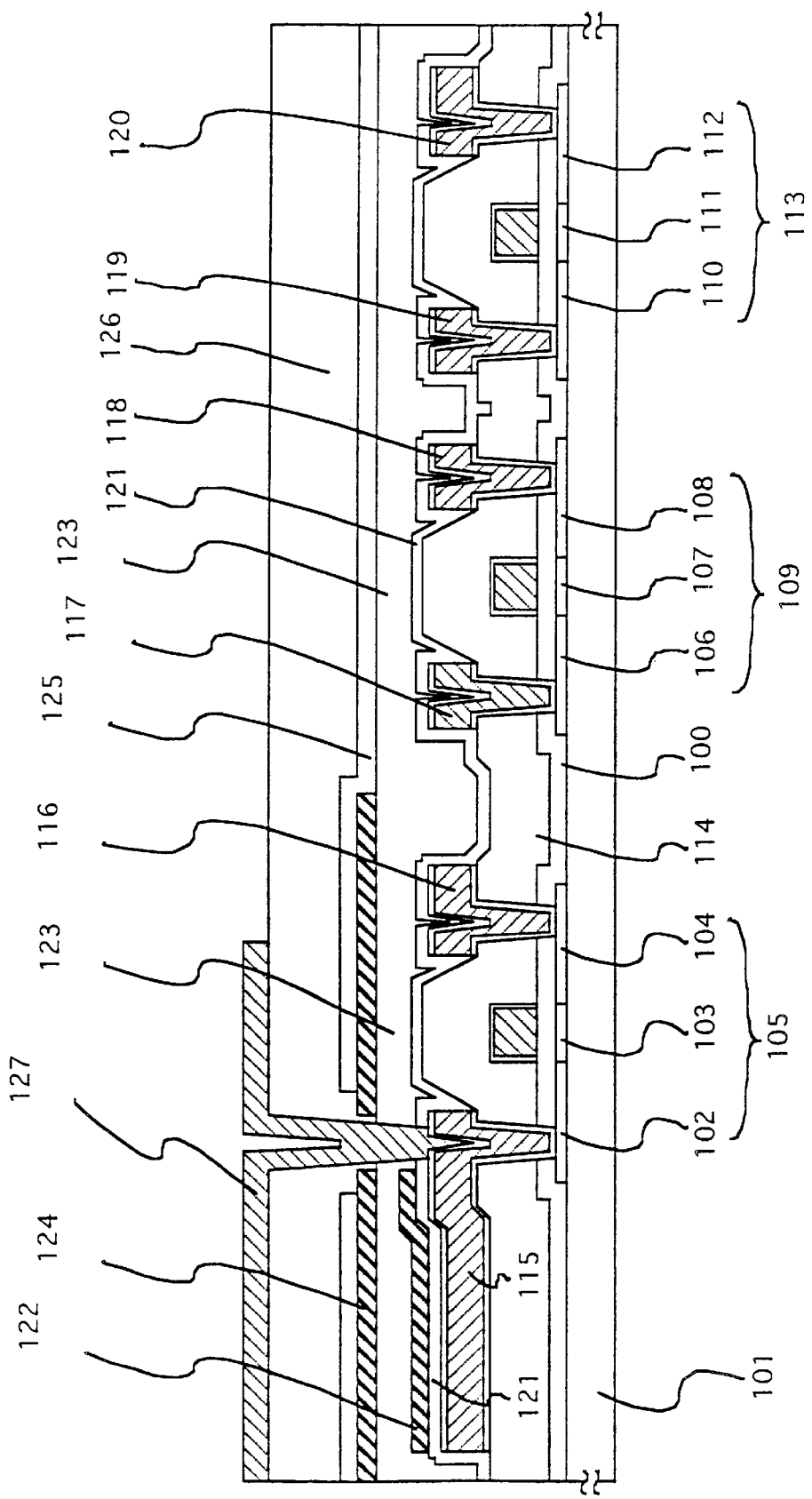
FIG. 1 is a view showing a cross section of a liquid crystal panel.

According to the present invention, as shown in FIG. 1, a DLC film 125 is provided on an interlayer insulating film 123 and a shielding titanium film 124. The DLC film effectively releases heat generated by a pixel TFT 105, and TFTs 109, 113 constituting a peripheral driving circuit.

[Embodiment 1]

FIG. 1 schematically shows a cross section of a reflection type liquid crystal panel using the present invention. In the drawing, reference numeral 101 denotes a glass substrate. A quartz substrate may be used instead of the glass substrate.

An NTFT 105 (N-channel thin film transistor, also called a pixel TFT) disposed in an active matrix circuit, and a PTFT 109 and an NTFT 113 constituting a peripheral driving circuit are disposed on the glass substrate 101.

A drain region 102, a channel region 103, and a source region 104 are formed in the NTFT 105.

A source region 106, a channel region 107, and a drain region 108 are formed in the PTFT 109.

A source region 112, a channel region 111, and a drain region 110 are formed in the NTFT 113.

The thickness of an active layer of the respective TFTs is made 50 nm. A silicon oxide film with a thickness of 100 nm as a common gate insulating film is provided in the respective TFTs.

The respective TFTs are covered with a silicon oxide film 114 with a thickness of 700 nm as an interlayer insulating film.

A source wiring line 116 brought into contact with the source region 104 of the NTFT 105, and a drain electrode 115 brought into contact with the drain region of the NTFT 105, each made of an aluminum film with a thickness of 500 nm, are disposed on the interlayer insulating film 114.

Also, a source electrode 117 brought into contact with the source region 106 of the PTFT 109 constituting the peripheral driving circuit, and a drain electrode 118 brought into contact with the drain region 108 of the PTFT 109 are disposed.

Also, a source electrode 120 brought into contact with the source region 112 of the NTFT 113 constituting the peripheral driving circuit, a drain electrode 119 brought into contact with the drain region 110 of the NTFT 113 are disposed.

A titanium film with a thickness of 100 nm is formed over and under the electrodes and wiring lines designated by 115, 116, 117, 118, 119, and 120. This film is necessary so as to have an excellent contact.

A silicon nitride film 121 with a thickness of 50 nm is formed to cover the electrodes and wiring lines designated by 115, 116, 117, 118, 119, and 120.

Further, a pattern 122 made of a titanium film is formed. A capacitance is formed by the pattern 122 made of the titanium film and the drain electrode 115 through the silicon nitride film 121.

Reference numeral 123 denotes a polyimide resin film with a thickness of 800 nm. This resin film is provided to absorb roughness formed by the existence of the TFTs, the electrodes, and the wiring lines so that a flattened surface is produced.

Resin material such as polyimide amide, polyamide, acryl, and epoxy may be used other than polyimide.

An electromagnetic shielding pattern 124 made of a titanium film with a thickness of 100 nm is disposed on the interlayer insulating film 123. This electromagnetic shielding pattern is disposed so that a reflecting pixel electrode 127 does not interfere with the source wiring line and the TFT.

A DLC (Diamond-like Carbon) 125 with a thickness of 1000 nm is formed.

Figure 2:
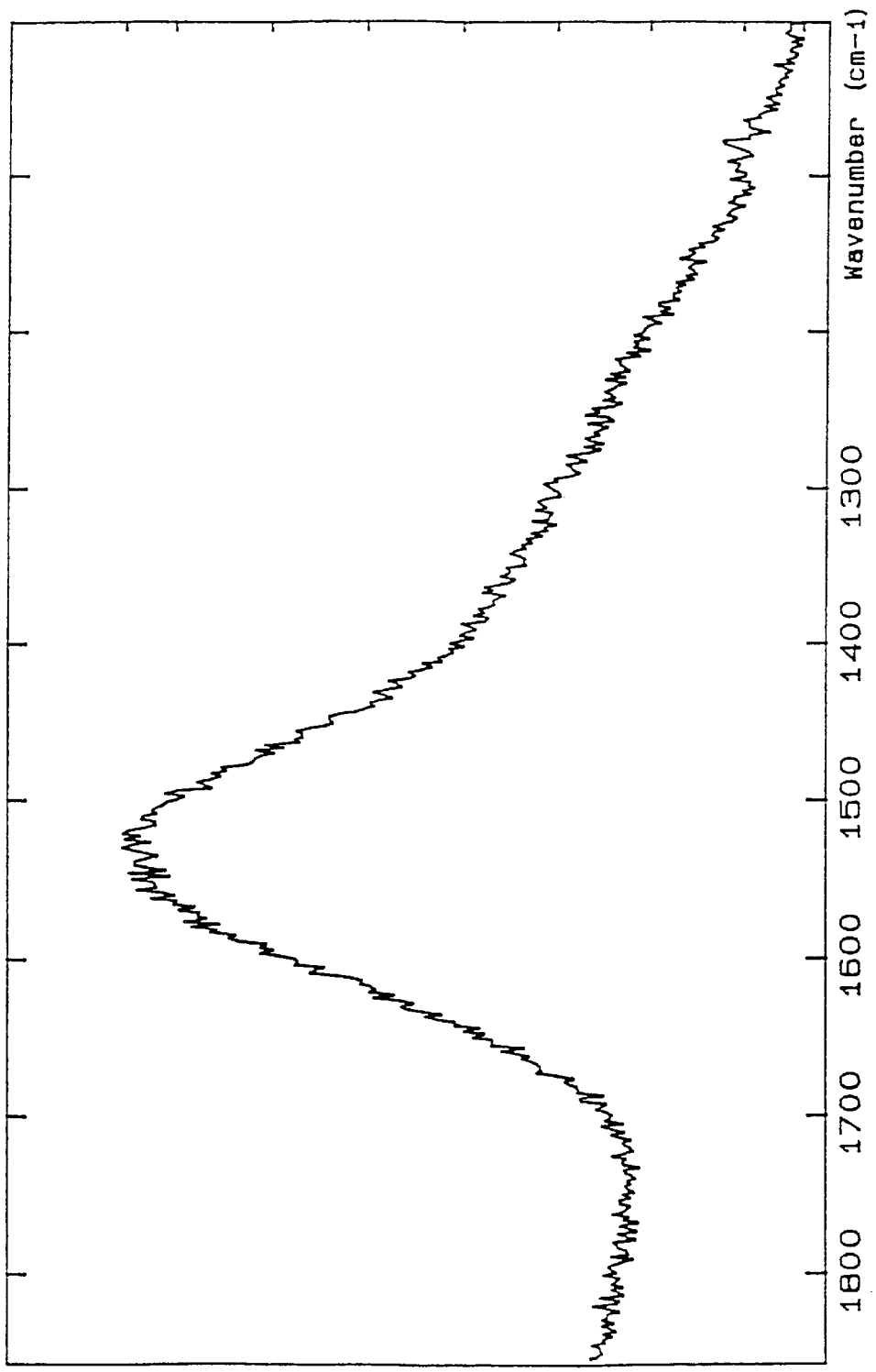
FIG. 2 is a view showing the Raman spectrum of a DLC film.

As the DLC film, it is preferable to use a film which exhibits the Raman spectrum as shown in FIG. 2.

Since the DLC film can be easily formed on the resin material, and has high heat conductivity, the DLC film effectively functions as a heat sink especially for diffusing heat generated by the TFTs of the peripheral driving circuit.

In a reflection type liquid crystal panel, there is no problem even if the DLC film extends to a pixel matrix portion. The adoption of such a structure enables the film to deal with heat generation from not only the peripheral driving circuit but also the pixel matrix portion.

Incidentally, although an AlN film and a diamond film other than the DLC film may be exemplified as a thin film that can be used as a heat sink, the DLC film can be most easily formed on a resin material.

A polyimide resin film 126 with an average thickness of 1 $\mu$m as an interlayer insulating film is formed on the DLC film, and further the reflecting pixel electrode 127 having a thickness of 400 nm and made of aluminum, is provided.

In this embodiment, although a top-gate type TFT is shown, a bottom-gate type TFT may be adopted.

[Embodiment 2]

In this embodiment, examples of display devices using the reflection type liquid crystal panel obtained by using the present invention will be described.

Figure 3A:
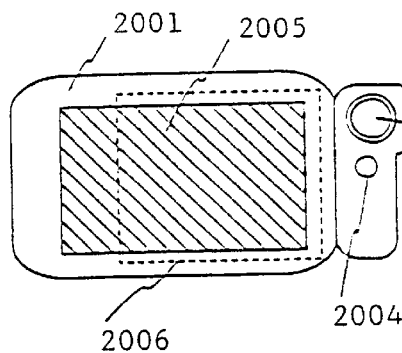
FIGS. 3A to 3F are views schematically showing devices using the present invention.

FIG. 3A shows a portable information processing terminal, which has a communication function using telephone lines.

This device includes an integrated circuit 2006 in the inside of a main body 2001. Further, this device includes a reflection type active matrix liquid crystal panel 2005 in which TFTs as switching elements are disposed, a camera portion 2002 for incorporating a picture image, and an operation switch 2004.

Figure 3B:
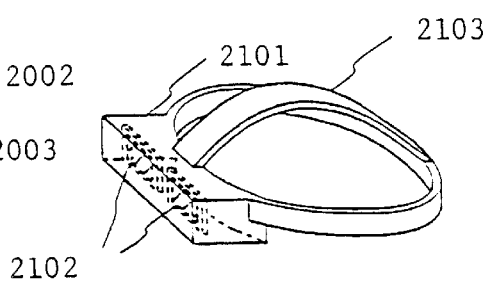

FIG. 3B shows an electric device called a head mount display. This device has a function to display a false picture image in front of eyes when a main body 2101 is mounted on a head through a band 2103. The picture image is formed by active matrix type liquid crystal panels 2102 corresponding to right and left eyes.

Figure 3C:
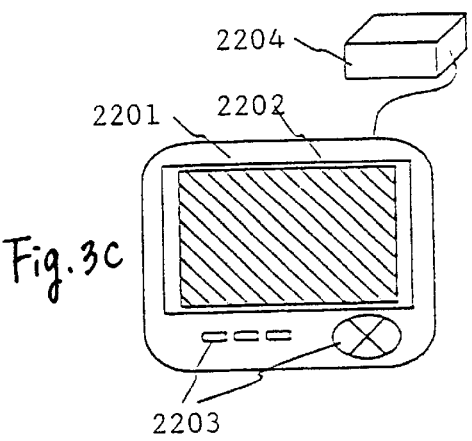

FIG. 3C shows an electric device having a function to display map information and various kinds of information based on signals from an artificial satellite. Information from an artificial satellite is received by an antenna 2204, and is processed by an electric circuit provided in the inside of a main body 2201, and necessary information is displayed on an active matrix type reflection type liquid crystal panel 2202.

The operation of the device is carried out by an operation switch 2203. Even in such a device, a circuit using TFTs is used.

Figure 3D:
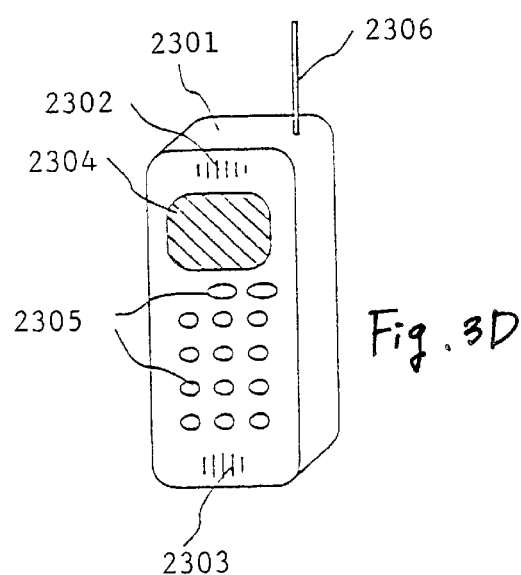

FIG. 3D shows a portable telephone. This electric device includes a main body 2301, an antenna 2306, an audio output portion 2302, a liquid crystal panel 2304, an operation switch 2305, and an audio input portion 2303.

Figure 3E:
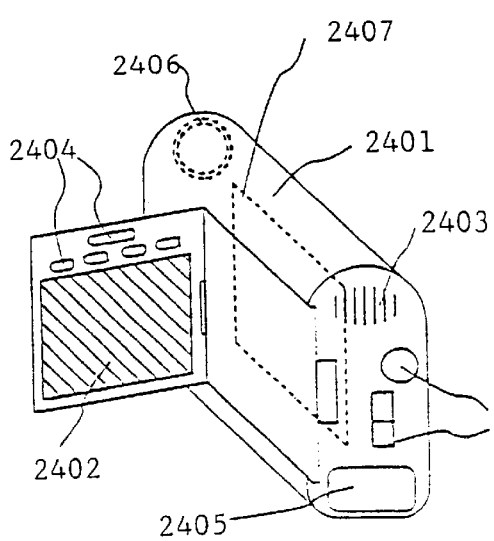

FIG. 3E shows a portable imaging device called a video camera. This device includes a reflection type liquid crystal panel 2402 attached to a close-open member of a main body 2401, and an operation switch 2404 attached to the close-open member.

Further, the main body 2401 is provided with an image receiving portion 2406, an integrated circuit 2407, an audio input portion 2403, an operation switch 2404, and a battery 2405.

Figure 3F:
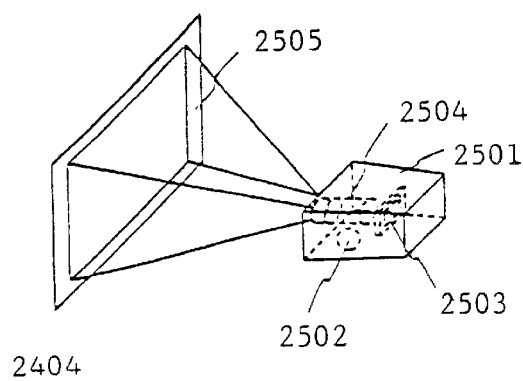

FIG. 3F shows a projection type liquid crystal display device. This device includes a main body 2501 provided with a light source 2502, a reflection type liquid crystal panel 2503, and an optical system 2504, and has a function to project a picture image onto a screen 2505.

It should be noted that the present invention can also be used for a flat panel display other than the case of using a liquid crystal. For example, in an EL display, the present invention can be used when an under layer of a light emitting layer is flattened. The present invention can also be used for an EC display and the like.

That is, the present invention can be used for realizing the structure in which a surface over a pixel region is desired to be flat.

As described above, by using the present invention, it is possible to provide a structure in which heat generated by a peripheral driving circuit can be effectively radiated. Also it is possible to provide a structure in which heat generated in the inside of a liquid crystal panel can be effectively radiated.

What is claimed is:

1. A device having at least one active matrix panel, said active matrix panel comprising:
   a substrate having an insulating surface;
   an active matrix circuit comprising first thin film transistors formed over the substrate;
   a driving circuit comprising second thin film transistors for driving the active matrix circuit;
   a first insulating film formed over the first and second thin film transistors;
   at least one drain electrode formed on the first insulating film and electrically connected to a drain region of at least one of the first thin film transistors through a contact hole of the first insulating film;
   a second insulating film formed over the first insulating film and the drain electrode;
   an electromagnetic shield pattern formed over the second insulating film;
   a fourth insulating film comprising an inorganic material on at least the electromagnetic shield pattern;
   a third insulating film comprising an organic resin formed over the second and fourth insulating films and the electromagnetic shield pattern; and
   at least one reflective pixel electrode formed over the third insulating film and electrically connected to the drain electrode through a hole opened through the third insulating film, the electromagnetic shield pattern and the second insulating film,
      wherein the third insulating film extends into a gap between the reflective pixel electrode and an inner edge of the opening of the electromagnetic shield pattern,
      wherein the third insulating film extends into a gap between the reflective pixel electrode and an inner edge of the opening of the fourth insulating film.

2. A device according to claim 1 wherein the first interlayer insulating film comprises silicon oxide.

3. A device according to claim 1 wherein the pixel electrodes comprise aluminum.

4. A device according to claim 1 wherein the substrate is a glass substrate.

5. A device according to claim 1 wherein the first thin film transistors are of an N-channel type.

6. A device according to claim 1 wherein each of the first and second thin film transistors is of a top-gate type.

7. A device according to claim 1 wherein each of the first and second thin film transistors is of a bottom-gate type.

8. A device according to claim 1 wherein the second interlayer insulating film comprises a material selected from the group consisting of polyimide, polyimide amide, polyamide, acryl, and epoxy.

9. A device according to claim 1 wherein the drain electrode comprises a pair of first layers comprising titanium and a second layer comprising aluminum interposed therebetween.

10. A device according to claim 1 wherein the third interlayer insulating film comprises polyimide.

11. A device according to claim 1 wherein the device is an EL display device.

12. A device according to claim 1 wherein the device is a portable information processing terminal, which comprises a main body, an integrated circuit in the main body, the active matrix panel, a camera portion for incorporating a picture image, and an operation switch.

13. A head mount display using the active matrix panel according to claim 1.

14. A device according to claim 1 further comprising an antenna wherein said active matrix panel displays a map information received by said antenna from an artificial satellite.

15. A device according to claim 1 wherein said device is a portable telephone, which comprises a main body, an antenna, an audio output portion, said active matrix panel, an operation switch, and an audio input portion.

16. A video camera having the active matrix panel according to claim 1.

17. A device according to claim 1 wherein said device is a projector having said active matrix panel, a light source, an optical system and a screen.

18. A device having at least one active matrix panel, said active matrix panel comprising:
   a substrate having an insulating surface;
   an active matrix circuit comprising first thin film transistors formed over the substrate;
   a driving circuit comprising second thin film transistors for driving the active matrix circuit;
   a first insulating film formed over the first and second thin film transistors;
   at least one drain electrode formed on the first insulating film and electrically connected to a drain of at least one of the first thin film transistors through a contact hole of the first insulating film;
   a second insulating film comprising an organic resin formed over the first insulating film and the drain electrode;
   at least one pixel electrode formed over the second insulating film and electrically connected to one of the first thin film transistors via the drain electrode,
wherein an insulating layer comprising silicon nitride is formed between the first and second insulating films and is formed over the drain electrode.

19. A device according to claim 18 wherein the first interlayer insulating film comprises silicon oxide.

20. A device according to claim 18 wherein the pixel electrodes comprises aluminum.

21. A device according to claim 18 wherein the substrate is a glass substrate.

22. A device according to claim 18 wherein each of the first and second thin film transistors is of a top-gate type.

23. A device according to claim 18 wherein each of the first and second thin film transistors is of a bottom-gate type.

24. A device according to claim 18 wherein the second interlayer insulating film comprises a material selected from the group consisting of polyimide, polyimide amide, polyamide, acryl, and epoxy.

25. A device according to claim 18 wherein the drain electrode comprises a pair of first layers comprising titanium and a second layer comprising aluminum interposed therebetween.

26. A device according to claim 18 wherein the device is an EL display device.

27. A device according to claim 18 wherein the device is a portable information processing terminal, which comprises a main body, an integrated circuit in the main body, the active matrix panel, a camera portion for incorporating a picture image, and an operation switch.

28. A head mount display using the active matrix panel according to claim 18.

29. A device according to claim 18 further comprising an antenna wherein said active matrix panel displays a map information received by said antenna from an artificial satellite.

30. A device according to claim 18 wherein said device is a portable telephone, which comprises a main body, an antenna, an audio output portion, said active matrix panel, an operation switch, and an audio input portion.

31. A video camera having the active matrix panel according to claim 18.

32. A device according to claim 18 wherein said device is a projector having said active matrix panel, a light source, an optical system and a screen.

33. A device having at least one active matrix panel, said active matrix panel comprising:
   a substrate having an insulating surface;
   an active matrix circuit comprising first thin film transistors formed over the substrate;
   a driving circuit comprising second thin film transistors for driving the active matrix circuit;
   a first insulating film formed over the first and second thin film transistors;
   at least one wiring formed on the first insulating film and electrically connected to one of a source region or a drain region of at least one of the first and second thin film transistors through a contact hole of the first insulating film;
   a second insulating film comprising an organic resin formed over the first insulating film and the wiring;
   at least one pixel electrode formed over the second insulating film and electrically connected to one of the first thin film transistors,
wherein an insulating layer comprising silicon nitride is formed between the first and second insulating films and is formed on the wiring.

34. A device according to claim 33 wherein the first interlayer insulating film comprises silicon oxide.

35. A device according to claim 33 wherein the pixel electrodes comprise aluminum.

36. A device according to claim 33 wherein the substrate is a glass substrate.

37. A device according to claim 33 wherein each of the first and second thin film transistors is of a top-gate type.

38. A device according to claim 33 wherein each of the first and second thin film transistors is of a bottom-gate type.

39. A device according to claim 33 wherein the second interlayer insulating film comprises a material selected from the group consisting of polyimide, polyimide amide, polyamide, acryl, and epoxy.

40. A device according to claim 33 wherein the at least one wiring comprises a pair of first layers comprising titanium and a second layer comprising aluminum interposed therebetween.

41. A device according to claim 33 wherein the device is an EL display device.

42. A device according to claim 33 wherein the device is a portable information processing terminal, which comprises a main body, an integrated circuit in the main body, the active matrix panel, a camera portion for incorporating a picture image, and an operation switch.

43. A head mount display using the active matrix panel according to claim 33.

44. A device according to claim 33 further comprising an antenna wherein said active matrix panel displays a map information received by said antenna from an artificial satellite.

45. A device according to claim 33 wherein said device is a portable telephone, which comprises a main body, an antenna, an audio output portion, said active matrix panel, an operation switch, and an audio input portion.

46. A video camera having the active matrix panel according to claim 33.

47. A device according to claim 33 wherein said device is a projector having said active matrix panel, a light source, an optical system and a screen.

48. A device having at least one active matrix panel, said active matrix panel comprising:
a substrate having an insulating surface;
an active matrix circuit comprising first thin film transistors formed over the substrate;
a driving circuit comprising second thin film transistors for driving the active matrix circuit;
a first insulating film formed over the first and second thin film transistors;
at least one first electrode formed on the first insulating film and electrically connected to the first thin film transistors;
at least one second electrode formed on the first insulating film and electrically connected to the second thin film transistors;
a second insulating film comprising an organic resin formed over the first insulating film and the first and second electrodes;
at least one pixel electrode formed over the second insulating film and electrically connected to one of the first thin film transistors,
wherein an insulating layer comprising silicon nitride is formed on the first insulating film, the at least one first electrode and the at least second electrode.

49. A device according to claim 48 wherein the first interlayer insulating film comprises silicon oxide.

50. A device according to claim 48 wherein the second interlayer insulating film comprises a material selected from the group consisting of polyimide, polyimide amide, polyamide, acryl, and epoxy.

51. A device according to claim 48 wherein the device is an EL display device.

52. A device according to claim 48 wherein the device is a portable information processing terminal, which comprises a main body, an integrated circuit in the main body, the active matrix panel, a camera portion for incorporating a picture image, and an operation switch.

53. A head mount display using the active matrix panel according to claim 48.

54. A device according to claim 48 further comprising an antenna wherein said active matrix panel displays a map information received by said antenna from an artificial satellite.

55. A device according to claim 48 wherein said device is a portable telephone, which comprises a main body, an antenna, an audio output portion, said active matrix panel, an operation switch, and an audio input portion.

56. A video camera having the active matrix panel according to claim 48.

57. A device according to claim 48 wherein said device is a projector having said active matrix panel, a light source, an optical system and a screen.

58. A device having at least one active matrix panel, said active matrix panel comprising:
a substrate having an insulating surface;
an active matrix circuit comprising first thin film transistors formed over the substrate;
a driving circuit comprising second thin film transistors for driving the active matrix circuit;
a first insulating film formed over the first and second thin film transistors;
at least one first electrode formed on the first insulating film and electrically connected to the first thin film transistors;
at least one second electrode formed on the first insulating film and electrically connected to the second thin film transistors;
a second insulating film comprising an organic resin formed over the first insulating film and the first and second electrodes;
an electromagnetic shield pattern formed on the second insulating film;
a third insulating film formed over the second insulating film and the electromagnetic shield pattern; and
at least one pixel electrode formed over the third insulating film and electrically connected to one of the first thin film transistors,
wherein an insulating layer comprising silicon nitride is formed on the first insulating film, the at least one first electrode and the at least second electrode.

59. A device according to claim 58 wherein the first interlayer insulating film comprises silicon oxide.

60. A device according to claim 58 wherein the device is an EL display device.

61. A device according to claim 58 wherein the device is a portable information processing terminal, which comprises a main body, an integrated circuit in the main body, the active matrix panel, a camera portion for incorporating a picture image, and an operation switch.

62. A head mount display using the active matrix panel according to claim 58.

63. A device according to claim 58 further comprising an antenna wherein said active matrix panel displays a map information received by said antenna from an artificial satellite.

64. A device according to claim 58 wherein said device is a portable telephone, which comprises a main body, an antenna, an audio output portion, said active matrix panel, an operation switch, and an audio input portion.

65. A video camera having the active matrix panel according to claim 58.

66. A device according to claim 58 wherein said device is a projector having said active matrix panel, a light source, an optical system and a screen.

67. A device having at least one active matrix panel, said active matrix panel comprising:

a substrate having an insulating surface;

an active matrix circuit comprising first thin film transistors formed over the substrate;

a driving circuit comprising second thin film transistors for driving the active matrix circuit;

a first insulating film formed over the first and second thin film transistors;

at least one first electrode formed on the first insulating film and electrically connected to the first thin film transistors;

at least one second electrode formed on the first insulating film and electrically connected to the second thin film transistors;

an insulating layer formed on the first insulating film and covering the first electrode and the second electrode wherein the insulating film comprises silicon nitride;

a capacitor forming electrode formed on the insulating layer comprising silicon nitride to form a capacitor associated with the first thin film transistor;

a second insulating film comprising an organic resin formed on the insulating layer comprising silicon nitride and the capacitor forming electrode;

at least one pixel electrode formed over the second insulating film and electrically connected to one of the first thin film transistors.

68. A device according to claim 67 wherein the device is an EL display device.

69. A device according to claim 67 wherein the device is a portable information processing unit terminal, which comprises a main body, an integrated circuit in the main body, the active matrix panel, a camera portion for incorporating a picture image, and an operation switch.

70. A head mount display using the active matrix panel according to claim 67.

71. A device according to claim 67 wherein further comprising an antenna wherein said active matrix panel displays a map information received by said antenna from an artificial satellite.

72. A device according to claim 67 wherein said device is a portable telephone, which comprises a main body, an antenna, an audio output portion, said active matrix panel, an operation switch, and an audio input portion.

73. A video camera having the active matrix panel according to claim 67.

74. A device according to claim 67 wherein said device is a projector having said active matrix panel, a light source, an optical system and a screen.

75. A device having at least one active matrix panel, said active matrix panel comprising:

a substrate having an insulating surface;

an active matrix circuit comprising first thin film transistors formed over the substrate;

a driving circuit comprising second thin film transistors for driving the active matrix circuit;

a first insulating film formed over the first and second thin film transistors;

at least one wiring formed on the first insulating film and electrically connected to at least one of the first and second thin film transistors;

an insulating layer comprising silicon nitride formed on the first insulating film and the at least one wiring;

a second insulating film comprising an organic resin formed over the first insulating film and the at least one wiring with the insulating layer interposed therebetween;

an electromagnetic shield pattern formed on the second insulating film;

a third insulating film comprising an organic resin formed over the second insulating film and the electromagnetic shield pattern; and at least one pixel electrode formed over the third insulating film and electrically connected to one of the first thin film transistors.

76. A device according to claim 75 wherein the device is an EL display device.

77. A device according to claim 75 wherein the device is a portable information processing unit terminal, which comprises a main body, an integrated circuit in the main body, the active matrix panel, a camera portion for incorporating a picture image, and an operation switch.

78. A head mount display using the active matrix panel according to claim 75.

79. A device according to claim 75 wherein further comprising an antenna wherein said active matrix panel displays a map information received by said antenna from an artificial satellite.

80. A device according to claim 75 wherein said device is a portable telephone, which comprises a main body, an antenna, an audio output portion, said active matrix panel, an operation switch, and an audio input portion.

81. A video camera having the active matrix panel according to claim 75.

82. A device according to claim 75 wherein said device is a projector having said active matrix panel, a light source, an optical system and a screen.

* * * * *